United States Patent [19]

Boyd, Jr.

[11] Patent Number: 4,642,497
[45] Date of Patent: Feb. 10, 1987

[54] HERMETIC COMPRESSOR UNIT AND STATIONARY ASSEMBLY

[75] Inventor: John H. Boyd, Jr., Holland, Mich.
[73] Assignee: General Electric Company, Fort Wayne, Ind.
[21] Appl. No.: 605,225
[22] Filed: Apr. 30, 1984
[51] Int. Cl.[4] .............................................. H02K 11/00
[52] U.S. Cl. ...................................... 310/68 R; 310/71
[58] Field of Search ......................... 310/71, 68, 62, 66

[56] References Cited

U.S. PATENT DOCUMENTS

| | | | |
|---|---|---|---|
| 2,133,985 | 10/1938 | Green | 310/71 X |
| 3,295,083 | 12/1966 | Fiore | 310/71 X |
| 3,586,910 | 6/1971 | Sauber | 310/71 X |
| 3,716,733 | 2/1973 | Keith et al. | 310/71 |
| 3,772,544 | 11/1973 | Wrobel | 310/71 |
| 3,970,881 | 7/1976 | Sato | 310/68 |
| 3,976,965 | 8/1976 | Remus | 310/71 X |

Primary Examiner—Donovan F. Duggan
Attorney, Agent, or Firm—Ralph E. Krisher, Jr.

[57] ABSTRACT

A method of assembling a stationary assembly for a dynamoelectric machine. A set of winding lead ends are extended from a preselected part of the winding means for the stationary assembly, and the winding lead ends are cut to a preselected length. A set of tubes of a dielectric material are placed about the winding lead ends, and the winding lead ends are terminated with a plug member. The winding lead ends are wrapped generally spirally about means of the assembly including the plug member and a retaining member therefor for establishing a lost motion engagement between the plug and retaining members, and the retaining member is mounted with the stationary assembly at least generally adjacent the preselected part of the winding means. The assembly has a preselected maximum length upon the operation of the establishing means to effect the lost motion engagement between the plug and retaining members with the preselected maximum length being predeterminately less than the preselected length of the winding lead ends.

A stationary assembly and a hermetic compressor unit are also disclosed.

17 Claims, 10 Drawing Figures

HERMETIC COMPRESSOR UNIT AND STATIONARY ASSEMBLY

CROSS-REFERENCE TO RELATED APPLICATION

This application is related to the commonly assigned application of Alan L. Kindig and Fredus N. Peters Ser. No. 605,266 filed Apr. 30, 1984 concurrently herewith and entitled "Hermetic Compressor Unit" which is incorporated herein by reference.

FIELD OF THE INVENTION

This invention relates in general to electrical apparatus and in particular to a stationary assembly for a dynamoelectric machine, and a hermetic compressor unit.

BACKGROUND OF THE INVENTION

In the past manufacture or assembly of a stationary assembly, such as a stator or the like for instance, adapted for use in a hermetic type dynamoelectric machine, windings having various different electrical and physical configurations were placed or otherwise inserted into position in the stator either manually or by utilizing various coil placement equipment well known to the art. The windings so positioned in the stator included a plurality of coils of a conductor, such as a magnet wire or the like for instance, with each coil having at least one conductor loop, and the opposite side loop portions of the coils were received in winding accommodating slots provided in the stator between a pair of opposite end faces thereof while the opposite end loop portions of the coils were arranged in generally annular groupings thereof adjacent the opposite end faces of the stator, respectively. For convenience of terminating the windings when they were positioned in the stator, a plurality of conductor lead ends were brought out of the windings at only one opposite end loop grouping of the windings, and the actual number of such conductor lead ends depended, of course, upon the aforementioned electrical and physical configuration of the particular winding utilized in the stator. Then, heavily insulated terminating leads were spliced or otherwise connected with the conductor lead ends of the windings by suitable means, such as soldering, brazing or welding or the like. Upon the aforementioned splicing of the terminating leads with the conductor lead ends of the windings, the terminating leads were arranged with respect to the aforementioned one opposite end loop grouping of the windings so as to extend generally radially outwardly from an outer circumferential portion of such one opposite end loop grouping generally at a preselected location thereon. With the terminating leads so located on the one opposite end loop grouping of the windings, at least such one opposite end loop grouping was laced, and of course, the lacing generally retained the terminating leads in the located arrangement thereof on such one opposite end loop grouping. To complete the above discussed prior art assembly or manufacturing process of the stator for a hermetic type dynamoelectric machine, a set of terminals on the free end portions of the terminating leads were received against displacement in a plug device of well known construction.

After the completion of the assembly of the prior art stator, as discussed above, it was found that the terminating leads extending from the one opposite end loop grouping of the windings and connected with the plug device provided a convenient "handle" which was used by many factory operators to pick up the stators in spite of admonitions against such a practice. One of the disadvantages or deleterious features of such past stator and assembly thereof is believed to be that the use of the aforementioned convenient "handle" to pick up the stator may have damaged the splice of the terminating leads with the conductor lead ends of the winding. Another disadvantageous or deleterious feature of such past stator and assembly thereof is believed to be that the splicing of the terminating leads with the conductor lead ends of the windings was time consuming and expensive with a resultant increase in the manufacturing cost of the stator.

SUMMARY OF THE INVENTION

Among the objects of the present invention may be noted the provision of an improved stationary assembly for a dynamoelectric machine, and an improved hermetic compressor unit which overcome the disadvantageous or deleterious features discussed hereinabove, as well as others, with respect to the prior art; the provision of such improved stationary assembly, and hermetic compressor unit in which a set of conductor lead ends integral with winding means for the stationary assembly are terminated with a plug device therefor; the provision of such improved stationary assembly in which an assembly is associated with the stationary assembly and the conductor lead ends and plug device so as to at least in part obviate force transmission through the conductor lead ends in the event the stationary assembly is picked up or otherwise handled by such conductor lead ends and plug device; the provision of such improved stationary assembly, and hermetic compressor unit in which means is associated with the conductor lead ends for insulating them electrically from each other; the provision of such improved stationary assembly, and hermetic compressor unit in which the conductor lead ends and the insulating means therefor are twisted together into a twisted bundle thereof with such twisted bundle having increased resistance to vibration effected upon the operation of such hermetic compressor unit; the provision of such improved stationary assembly, and hermetic compressor unit in which the conductor lead ends and the insulating means therefor are wrapped generally spirally about the assembly associated with the stationary assembly and the conductor lead ends and plug device; and the provision of such improved stationary assembly, and hermetic compressor unit in which the components utilized therein are simple in design, easily assembled, and economically manufactured. These as well as other objects and advantageous features of the present invention will be in part apparent and in part pointed out hereinafter.

In general, in one form of the invention a stationary assembly for a dynamoelectric machine has a core, and winding means for association with the core includes a plurality of winding means lead ends extending generally from a preselected part of the winding means and having a preselected length, respectively. Plug means is provided for receiving the winding means lead ends, respectively, and retaining means adapted for association with the plug means is secured at least adjacent the preselected part of the winding means. The retaining means and the plug means include means operable generally for establishing a lost motion engagement therebetween so that the distance between the plug means and the preselected part of the winding means is predeterminately less than the preselected length of the winding means lead ends in the event of the occurrence of the lost motion engagement between the plug means and the retaining means upon the operation of the establishing means, respectively.

Further in general and in one form of the invention, a hermetic compressor unit driven by a dynamoelectric machine adapted to be energized from a source of power includes a housing having a chamber therein. Means mounted to the housing, so as to extend in part therethrough into the chamber, is adapted for connection with the power source, the connect means utilized including a set of electrical connectors. A stationary assembly of the dynamoelectric machine disposed within the chamber includes winding means adapted for excitation upon the energization of the dynamoelectric machine, and a set of lead ends integral with the winding means and arranged so as to extend generally from a preselected part of the winding means, respectively. Another assembly includes: means, for receiving the lead ends of the winding means, associated with the connection means for interconnecting the lead ends of the winding means in circuit relation with the connection means; means for securement with the stationary assembly at least generally adjacent the preselected part of the winding means; and means, associated with the receiving and interconnecting means and the retaining means, operable generally for establishing a lost motion engagement therebetween, respectively.

Still further in general, a method is provided in one form of the invention for assembling a stationary assembly for a dynamoelectric machine. The stationary assembly includes winding means, a set of winding lead ends associated with the winding means, a set of elongate tubes of a dielectric material, and an assembly having a preselected maximum length. The assembly includes a plug member, a retaining member, and means associated with the plug and retaining members and operable generally for establishing a lost motion engagement therebetween. In practicing this method, the winding lead ends extend at least generally from a preselected part of the winding means, and the winding lead ends are cut to a preselected length predeterminately greater than the preselected maximum length of the assembly, respectively. The elongate tubes are placed in insulating relation at least in part about the winding lead ends, and the retaining means is mounted with the stationary assembly at least generally adjacent the preselected part of the winding means. The elongate tubes with the winding lead ends therein are wrapped generally spirally about the engagement means at least in part between the plug member and the retaining member, and the winding lead ends are terminated within the plug device, respectively.

BRIEF DESCRIPTION OF THE DRAWINGS

Corresponding reference characters refers to corresponding parts throughout the several views of the drawings.

The exemplifications set out herein illustrate a preferred embodiment of the present invention, and such exemplifications are not to be construed as limiting either the scope of the present invention or the disclosure thereof in any manner.

DETAILED DESCRIPTION OF THE PREFERRED EMBODIMENTS

Figure 1:
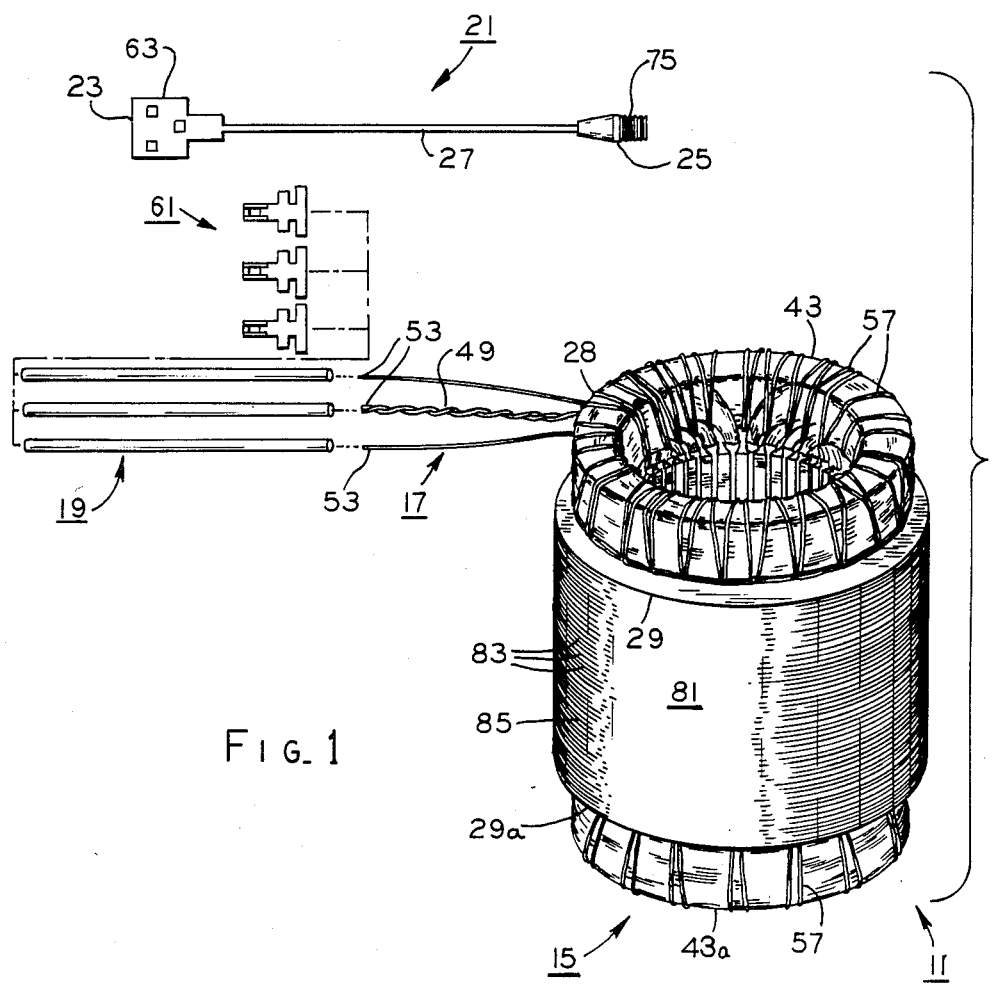
FIG. 1 is an exploded perspective view showing a stationary assembly in one form of the invention for a dynamoelectric machine and illustrating principles which may be practiced in a method of assembling the stationary assembly in one form of the invention.
Figure 2:
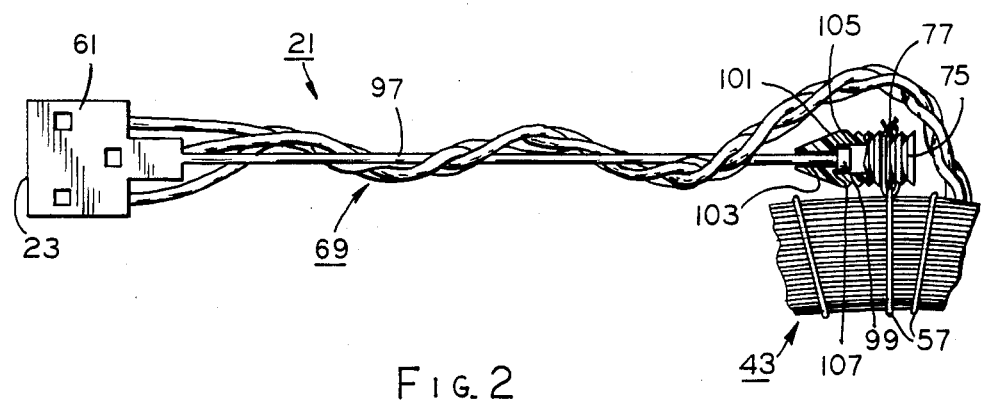
FIG. 2 is an enlarged partial sectional view illustrating the association of a connection assembly with a set of conductor lead ends of the winding means and one of the opposite generally annular end loop groupings of the winding means associated with the stationary assembly of FIG. 1.

With reference now to the drawings in general, there is illustrated in one form of the invention a method of assembling a stationary assembly, such as a stator 11 or the like for instance, for a dynamoelectric machine 13 (FIGS. 1-5). Stator 11 includes winding means 15, a set of winding or conductor lead ends 17 associated with the winding means, a set of elongate tubes 19 of a dielectric material, and a connection assembly 21 having a preselected maximum length (FIG. 1). Assembly 21 includes a plug member 23, a retaining member 25, and means indicated generally at 27 associated with the plug and retaining members and operable generally for establishing a lost motion engagement therebetween (FIG. 2). In practicing this method, winding lead ends 17 are extended from a preselected part 28 of winding means 15, and the winding lead ends are cut or otherwise trimmed to a preselected length predeterminately greater than the preselected maximum length of assembly 21, respectively (FIG. 1). Elongate tubes 19 are placed or positioned in insulating relation at least in part about winding lead ends 17, and the winding lead ends are terminated with plug member 23, respectively (FIGS. 1 and 2). Elongate tubes 19 with winding lead ends 17 therein are wrapped or otherwise disposed generally spirally about establishing means 27 of assembly 21 at least in part between plug member 23 and retaining member 25 thereof, and the retaining member is mounted or otherwise secured to stator 11 at least generally adjacent the preselected part of winding means 15 (FIG. 2).

Figure 3:
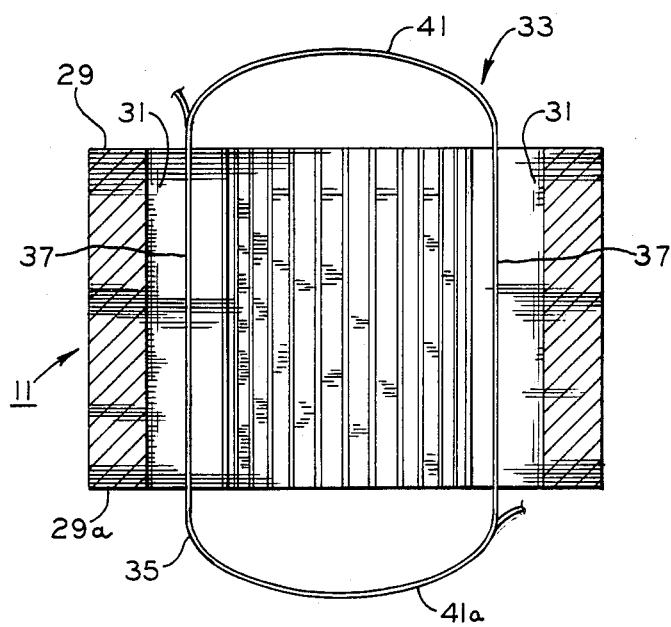
FIG. 3 is a schematic view illustrating an exemplary coil of the winding means having only one conductor loop associated with a core of the stationary assembly of FIG. 1.
Figure 4:
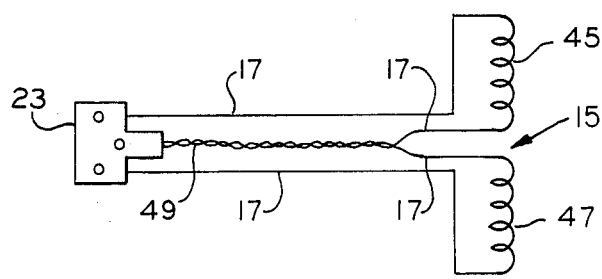
FIG. 4 is a schematic diagram of an exemplary winding configuration illustrating the connection of a main winding and an auxiliary winding thereof as may be employed in the winding means for the stationary assembly of FIG. 1.

More particularly and with specific reference to FIGS. 1, 2 and 3, stator 11 has a pair of opposite end faces 29, 29a, and a plurality of winding receiving slots 31 extend generally axially through the stator intersecting with the opposite faces thereof, respectively. Winding means 15 for stator 11 has a plurality of coils 33 formed of a conductor, such as a magnet wire having a coating of dielectric material thereon as well known in the art (not shown), and such coils may be placed or otherwise associated with the stator by suitable means well known to the art, such as coil placement or injection equipment or the like for instance (not shown). When winding means 15 is so associated with stator 11, each of coils 33 contains at least one conductor loop 35 with opposite side loop portions 37, 39 thereof received in slots 31 of the stator and with opposite end loop portions 41, 41a of the coils arranged in opposite generally annular groupings 43, 43a thereof adjacent opposite end faces 29, 29a of the stator, respectively. An exemplary arrangement of one conductor loop 35 of a coil 33 as received in stator 11 is illustrated schematically in FIG. 3 for clarity of disclosure. As also shown schematically in FIG. 4, winding means 15 comprises a main winding or main winding section 45 and an auxiliary winding or auxiliary winding section 47 each having a pair of conductor lead ends 17 brought out or extending therefrom, and one of the conductor leads of each of the main winding and the auxiliary winding are twisted or otherwise interconnected together thereby to define a common lead end 49 of the winding means. Common lead end 49 and the other of conductor lead ends 17 of each of main winding 45 and auxiliary winding 47 are respectively terminated by plug member or terminal block 23 of assembly 21 which is adapted for connection with a power source (not shown), as discussed in greater detail hereinafter. While winding means 15 is illustrated herein as comprising main and auxiliary windings 45, 47 for the purpose of disclosure, it is understood that various other winding schemes having different electrical and physical configurations and with different numbers of conductor lead ends may be utilized in stator 11 within the scope of the invention so as to meet at least some of the objects thereof.

Figure 5:
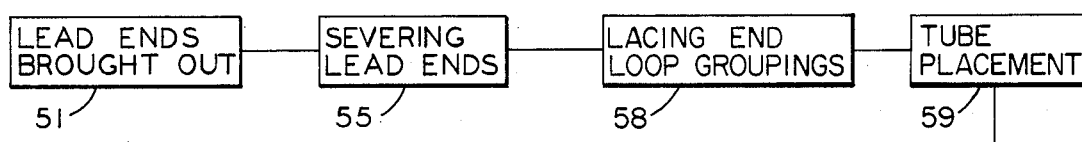
FIG. 5 is a schematic flow diagram illustrating steps in the method of assembling the stationary assembly of FIG. 1.
Figure 5:
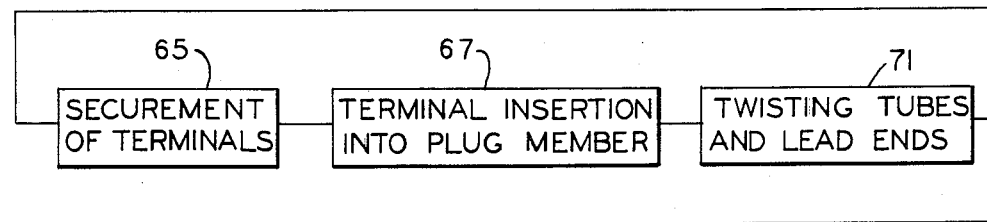
Figure 5:
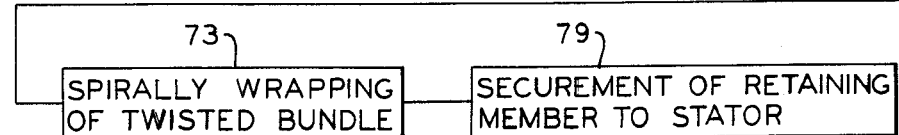

When winding means 15 is associated with stator 11, as discussed above, conductor lead ends 17 are brought out of the winding means into opposite end loop grouping 43, as shown in FIGS. 1 and 2 and as illustrated by a functional box 51 in FIG. 5, and the conductor lead ends are arranged so as to extend generally from preselected part 28 of opposite end loop grouping 43, as previously mentioned. For purposes of disclosure, conductor lead ends 17 are illustrated as being brought out of winding means 15 into or through opposite end loop grouping 43 at preselected part 28 thereof generally adjacent opposite face 29 of stator 11; however, it is contemplated that such conductor lead ends may be extended from the opposite end loop grouping at different preselected parts or locations thereof, such as for instance from the outer circumferential surface or section or from the free end portion of the opposite end loop grouping, within the scope of the invention so as to meet at least some of the objects thereof. Thus, with conducted lead ends 17 of winding means 15 brought out of end loop grouping 43 thereof, the conductor lead ends are arranged with respect to the end loop grouping so as to extend generally radially outwardly beyond the outer circumference thereof, respectively. At this time, conductor lead ends 17 may be cut or otherwise trimmed or severed at free end portions 53 thereof to define a preselected length of the conductor lead ends, as illustrated by a functional diagram box 55 in FIG. 5. Such preselected length may be measured generally between the cut free end portions of the conductor lead ends and preselected part 28 of opposite end loop grouping 43 of winding means 15 from which the conductor lead ends extend, respectively. It may be noted that the preselected length of conductor lead ends 17 is predeterminately greater than the aforementioned predetermined maximum length or distance between plug member 23 and retaining member 25 of assembly 21 which is discussed in greater detail hereinafter. Of course, it is contemplated that the severance of cut free end portions 53 on conductor lead ends 17 to the preselected length thereof may be effected in various different manners by the use of various different equipment within the scope of the invention so as to meet at least some of the objects thereof; however, since such equipment forms no part of this invention, a showing of such equipment and a description thereof is omitted for the sake of brevity. Either prior or subsequent to the aforementioned cutting of free end portions 53 of conductor lead ends 17, as discussed above, opposite end loop groupings 43, 43a of winding means 15 may be laced in a manner well known to the art with a suitable lacing material, such as twine 57 or the like for instance. The lacing of opposite end loop groupings 43, 43a of winding means 15 is illustrated by a functional box 58 in FIG. 5, and if a more detailed discussion of such lacing and equipment for accomplishing such lacing is desired, reference may be had to U.S. Pat. No. 3,659,337 issued May 2, 1972 to Roy E. Gawthrop et al. which is incorporated by reference herein.

Elongate tubes 19 are formed from a suitable material compatible with a hermetic environment and having desired physical and electrical insulating properties, such as Mylar or the like, for instance, available from E. I. DuPont De Nemours & Company, Wilmington, Del.; however, it is contemplated that other tubes formed of different materials may be utilized within the scope of the invention so as to meet at least some of the objects thereof. Upon the aforementioned cutting of free end portions 53 of conductor lead ends 17 to attain the preselected length thereof, tubes 19 may be placed or otherwise positioned in insulating relation about the conductor lead ends so that the elongate tubes extend at least in part generally between the free end portions of the conductor lead ends and preselected part 28 of opposite end turn grouping 43 of winding means 15 from which the conductor lead ends protrude, respectively. The association of tubes 19 with conductor lead ends 17 of winding means 15 is illustrated by a functional box 59 in FIG. 5. While tubes 19 are shown encasing common lead end 49 and one conductor lead end 17 of main and auxiliary windings 45, 47 in winding means 15 for purposes of disclosure, different numbers of conductor lead ends may extend from the winding means, as previously mentioned, and it is, of course, contemplated that each of such conductor leads may be encased within a tube 19 within the scope of the invention so as to meet at least some of the objects thereof. With elongate tubes 19 so encasing common lead end 49 and conductor lead ends 17, as discussed above, a set of terminals 61 may be secured by suitable means well known to the art, such as crimping or soldering or the like for instance, to free end portions 53 of the common lead end and the conductor lead ends, and the terminals are received in a casing 63 of plug member 23 against displacement therefrom in a manner well known to the art. The securement of terminals 61 and the placement of the terminals in casing 63 of plug member 23 are illustrated by functional boxes 65 and 67, respectively, in FIG. 5. If a more detailed discussion of plug member 23 and terminals 61 is desired, reference may be had to U.S. Pat. No. 3,764,960 issued Oct. 9, 1973 to Henry H. Heimbrock which is incorporated herein by reference; however, it is contemplated that other plug members and terminals of various different constructions may be utilized within the scope of the invention so as to meet the objects thereof.

When terminals 61 are received in casing 63 of plug member 23, as discussed above, the plug member and elongate tubes 19 with the common lead end and the conductor lead ends encased therein are manually twisted generally with respect to opposite end loop grouping 43 of the winding means thereby to form a twisted bundle 69 of the elongate tubes with the common lead end and the conductor lead ends encased therein, respectively, as best seen in FIG. 2. The formation of twisted bundle 69 is illustrated by a functional box 71 in FIG. 5. It is believed that the above discussed twisting of elongate tubes 19 with common lead end 49 and conductor lead ends 17 encased therein into twisted bundle 69 thereof increases the resistance thereof to vibration or vibratory movement, as discussed in greater detail hereinafter.

When elongate tubes 19 with common lead end 49 and conductor lead ends 17 encased therein are twisted into twisted bundle 69 thereof, as discussed above, the twisted bundle is wrapped generally spirally about at least a part of establishing means 27 of assembly 21 between plug member 23 and retaining member 25 thereof which is illustrated by a functional box 73 in FIG. 5. To complete the description of the method of assembling stator 11, retaining member 25 of assembly 23 is provided with a plurality of notches or threads 75 thereabout which serve as an anchor or the like for retaining against displacement a tie-string 77 which is also tied or otherwise secured to lacing twine 57 on opposite end loop grouping 43 of winding means 15 at least generally adjacent preselected part 28 thereof from which common end lead 49 and conductor end leads 17 extend. The above discussed securement of retaining member 25 to stator 11 is illustrated by a functional box 79 in FIG. 5.

Figure 6:
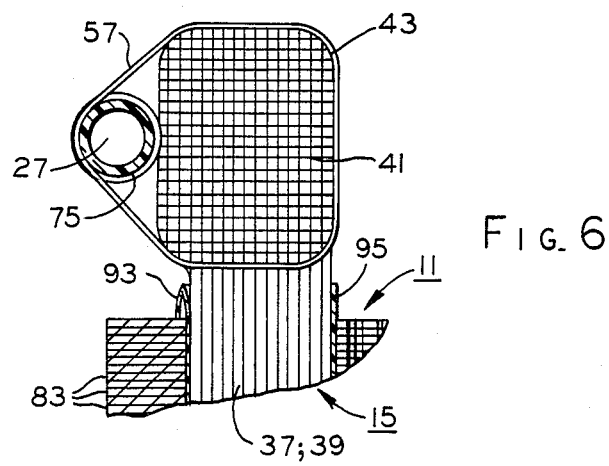
FIG. 6 is a partial sectional view illustrating an alternative construction in one form of the invention for securing the retaining member of the assembly of FIG. 2 to the stationary assembly.

An alternative method of assembling stator 11 in one form of the invention is illustrated in FIG. 6 having the same component parts assembled together in the same steps as the above discussed assembly method for the stator with the exceptions noted hereinafter; however, while this alternative assembling method meets at least some of the objects set out hereinbefore, it is believed that such alternative assembling method may have indigenous objects and advantageous features as will be in part apparent and in part pointed out in the following discussion.

In the alternative assembling method, retaining member 25 of assembly 21 is shown in FIG. 6 as being seated or abutted against opposite end loop grouping 43 of winding means 15 on stator 11 with lacing twine 57 being engaged with notches 75 in the retaining member during the aforementioned lacing operation thereby to secure assembly 21 to the stator. When assembly 21 is so secured to stator 11, elongate tubes 19 may be associated with common lead end 49 and conductor lead ends 17 of winding means 15 and terminals 61 may be secured to free end portions 53 thereof in the same manner as previously discussed. However, in this alternative assembling method since assembly 21 is secured to stator 15 during the lacing thereof, elongate tubes 15 with common lead end 49 and conductor lead ends 17 encased therein are twisted into the twisted bundle 69 thereof, and the twisted bundle is wrapped generally spirally about establishing means 27 of the assembly generally between plug member 23 and retaining member 25 thereof prior to the insertion of terminals 61 into casing 63 of the plug member. While retaining member 25 of assembly 21 has been discussed and shown herein as being both tied to lacing twine 57 (FIG. 2) and enveloped in such lacing twine (FIG. 6) so as to be secured with stator 11, it is contemplated that other retaining members may be employed with the assembly and secured with the stator in various other manners within the scope of the invention so as to meet at least some of the objects thereof.

Figure 8:
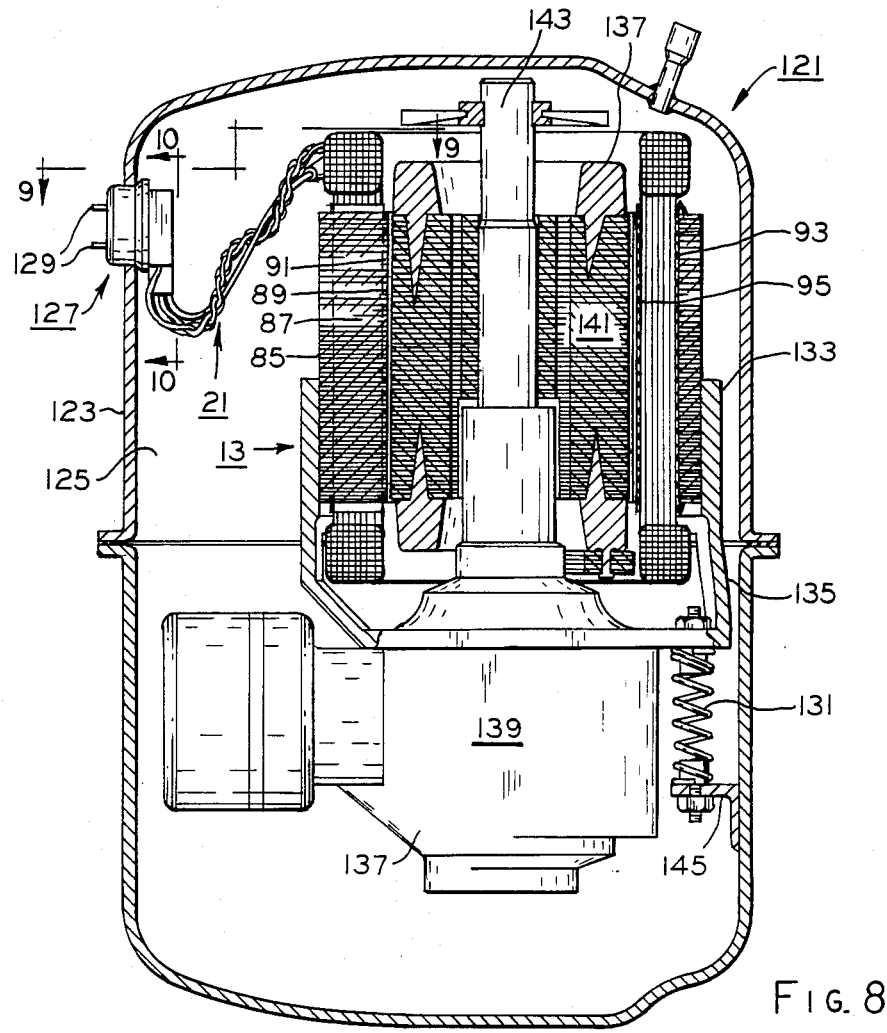
FIG. 8 is a sectional view illustrating a hermetic compressor unit in one form of the invention adapted to be driven by a dynamoelectric machine utilizing the stationary assembly of FIG. 1.

With reference again to the drawings in general and recapitulating at least in part with respect to the foregoing, stator 11 is shown in one form of the invention as having a core 81, and winding means 15 associated with the core includes conductor lead ends 17 extending generally from preselected part 28 of the winding means and having a preselected length, respectively (FIG. 1). Plug means or plug member 23 is provided for receiving conductor lead ends 17 of winding means 15, and retaining means or retaining member 25 adapted for association with the plug member is secured with stator 11 at least adjacent preselected part 28 of the winding means against displacement therefrom (FIGS. 1 and 2). Plug member 23 and retaining member 25 include establishing means 27 so that the preselected length or distance between the plug member and the preselected part of winding means 15 is predeterminately less than the preselected length of conductor lead ends 17 in the event of the lost motion engagement between the plug member and the retaining member upon the operation of the establishing means (FIG. 8).

More particularly and with specific reference to FIG. 2, core 81 of stator 11 comprises a stack of laminations 83 lanced or otherwise formed from a suitable material, such as a generally thin ferromagnetic sheet material or the like for instance, and arranged generally in face-to-face or surface-to-surface relation with each other so that the opposite end laminations define opposite end faces 29, 29a on the core, respectively. Core 81 has a yoke or yoke section 85 with an outer peripheral or circumferential surface 87 thereof interposed between opposite end faces 29, 29a of the core, and albeit not shown for purpose of drawing simplicity, it is contemplated that laminations 81 of the core may be retained in the stack thereof against displacement by various suitable means well known in the art, such as for instance welding, mechanically interlocking, bonding or cleating or the like, within the scope of the invention so as to meet at least some of the objects thereof. A plurality of generally arcuately spaced apart teeth 87 are integrally formed with yoke section 85 of core 81 and extend generally radially inwardly therefrom so as to define winding slots 31 between adjacent ones of the teeth, respectively. Teeth 87 have a plurality of tips 89 on the free end thereof defining in part a bore 91 which extend generally axially through core 81 intersecting with opposite end faces 29, 29a thereof, and winding slots 31, of course, intersect with the bore between adjacent ones of the teeth. A plurality of means, such as slot liners 93 or the like for instance, may be disposed at least in part within winding slots 31 of core 81 for electrically insulating opposite side loop portions 37, 39 of winding means 15 from the core, and another plurality of means, such as slot wedges 95 or the like for instance, are disposed at least in part within the winding slots in engagement with adjacent ones of tooth tips 89 for maintaining the opposite side loop portions of the winding means against displacement from the winding slots into bore 91 of the core, respectively, as well known in the art. While slot liners 93 and slot wedges 95 are shown herein for purposes of disclosure, it is contemplated that other winding insulation systems and other winding displacement preventing means may be employed with core 81 within the scope of the invention so as to meet at least some of the objects thereof. Further, it is also contemplated that other cores having configurations and constructions different than core 81, such as for instance a core edgewise and spirally wound from a continuous strip of ferromagnetic material or the like, may be utilized within the scope of the invention so as to meet at least some of the objects thereof.

As illustrated herein for purposes of disclosure, assembly 21 is formed of a polymeric material having desired physical and electrical insulation properties; however, it is contemplated that such assembly or the component parts thereof may be formed from other desired materials within the scope of the invention so as to meet at least some of the objects thereof. As best seen in FIG. 2, casing 63 of plug member 23 has an elongate member, such as a generally thin tail 97 or the like for instance, integrally formed therewith and extending therefrom generally toward opposite end loop portion 43 of winding means 15 associated with core 81. Elongate member or tail 97 of casing 63 has a free end or free end portion 99 thereon, and an enlarged abutment 101 is integrally provided on the free end of the casing tail. A pair of stepped passages 103, 105 extend through retaining member 25 of assembly 21, and free end 97 of casing tail 99 is movably or slidably received in the smaller stepped passage 103 of the retaining member so as to extend therethrough. A shoulder or abutment 107 is formed on retaining member 25 between stepped passages 103, 105 therein, and enlarged abutment 101 on free end 99 of casing tail 97 is slidable or movably received in the larger stepped passage 105 of the retaining member for lost motion engagement or connection with shoulder 107 thereof. Thus, enlarged abutment 101 on casing tail 97 and shoulder 107 on retaining member 25 are cooperable to define establishing means 27 of assembly 21 thereby to establish the lost motion engagement between plug member 23 and the retaining member.

When the assembling of stator 11 is completed as discussed above, plug member 23 of assembly 21 and twisted bundle 69 of tubes 19 with common lead end 49 and conductor lead ends 17 encased therein provide a convenient "handle" which may be grasped and used by some of the operators in the factory to pick up stator 11 in spite of admonitions against such a practice. Of course, in the event of the occasion that the aforementioned convenient "handle" is used so as to lift stator 11, a force is applied by the factory operator on plug 23 of assembly 21 which is effective to move the plug member relative to retaining member 25 secured to the stator. In response to such relative movement between the plug member 23 and retaining member 25 of assembly 21, free end 99 and enlarged abutment 101 of casing tail 97 are conjointly moved with the plug member through the lost motion spacing between the enlarged abutment in larger stepped passage 105 of the retaining member and shoulder 107 thereof so as to abut the enlarged abutment with the shoulder thereby to define or establish the lost motion engagement between the plug and retaining members. Upon the establishment of the lost motion engagement between plug and retaining members 23, 25 of assembly 21 in response to the applied force acting thereon to lift stator 15, as discussed above, it may be noted that the assembly is effective to obviate the transmission of the applied or lifting force through common lead end 49 and conductor lead ends 17 of winding means 15 to opposite end loop grouping 43 thereof. For instance, when the lost motion engagement between shoulder 107 of retaining member 25 and enlarged abutment 101 on casing tail 97 of plug member 23 is established in response to the lifting force applied by the factory operator to lift stator 11, as discussed above, assembly 21 is extended into the aforementioned preselected maximum length thereof; therefore, since the preselected lengths of common lead end 49 and conductor lead ends 17 of winding means 15 are predeterminately greater than the preselected maximum length of assembly 21, the weight of stator 15 is at least for the most part supported by the assembly when the plug member and the twisted bundle 69 of tubes 19 are utilized as the aforementioned convenient "handle" by the factory operator to lift the stator. Thus, it is believed that assembly 21 is effective to in effect bypass the aforementioned applied force about common lead end 49 and conductor lead ends 17 of winding means 15 when stator 15 is lifted by the aforementioned convenient "handle" thereby to preserve the electrical and structural integrity of the winding means.

Figure 7:
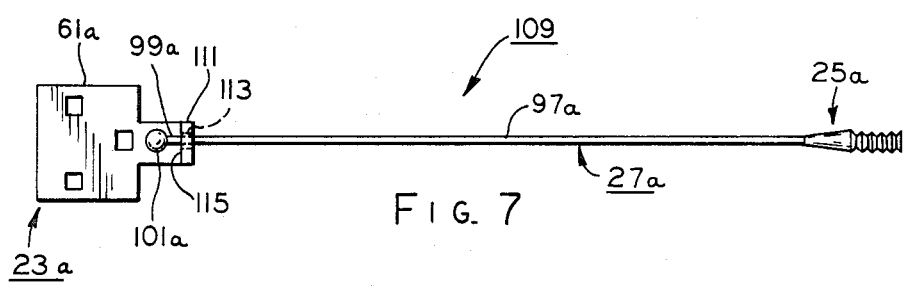
FIG. 7 is a partial sectional view illustrating an alternative connection assembly associated with the conductor lead ends of the winding means and the stationary assembly in one form of the invention and illustrating principles which may be practiced in an alternative method of assembling the stationary assembly of FIG. 1.

In FIG. 7, there is illustrated an alternative connection assembly 109 having generally the same component parts as the previously discussed assembly 21 and which may be assembled and utilized with stator 11 in one form of the invention generally in the same manner as the previously discussed assembly 21 with the exception noted hereinafter. While the assembly and utilization of assembly 109 with stator 11 meets at least some of the objects set out above, it is believed that such assembly and utilization of assembly 109 with stator 11 may have indigenous objects which will be in part apparent and in part pointed out in the following discussion.

In assembly 109, an elongate member or tail 97a is integrally formed with a retaining member 25a of a generally solid construction, i.e., without passages therein, and the tail extends from the retaining member toward a plug member 23a. A hasp or extension 111 or the like for instance is integrally formed on a casing 63a of plug member 23a, and a free end portion 99a on tail 97a of retaining member 23a is slidably or movably received in an opening or passage 113 through the hasp. An enlarged abutment 101a on tail 97a of retaining member 25a is movable relative to casing hasp 111 into lost motion engagement or abutment with a surface or shoulder 115 provided on the casing hasp generally about opening 113 therethrough. Thus, the preselected maximum length of assembly 109 between plug and retaining members 23a, 25a thereof is established upon the lost motion engagement between enlarged abutment 101a on tail 97a of the retaining member with shoulder 115 on hasp 111 of plug member casing 63a which defines establishing means 27a.

Figure 9:
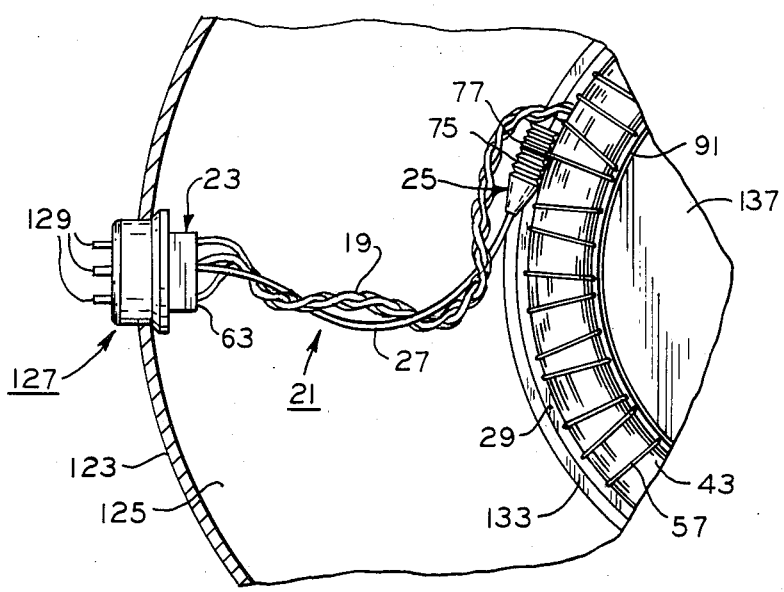
FIGS. 9 and 10 are enlarged partial sectional views taken along lines 9—9 and 10—10 in FIG. 8, respectively.
Figure 10:
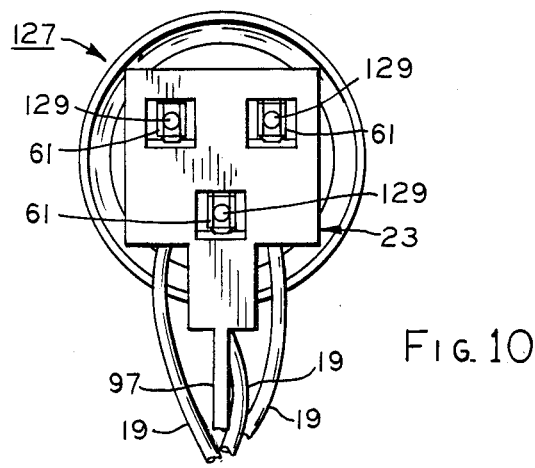

With further reference to the drawings in general and further recapitulation at least in part with respect to the foregoing, there is illustrated in one form of the invention a hermetic compressor unit 121 driven by dynamoelectric machine 13 adapted to be energized from a source of power (not shown) (FIGS. 8-10). Unit 121 has a housing 123 with a chamber 125 therein, and means, such as a Fusite plug or connection block 127 or the like for instance, mounted to the housing so as to extend in part therethrough into the chamber is adapted for connection with the power source, the connection means or Fusite plug includes a set of electrical connectors or pins 129 (FIG. 8). Stator 11 of dynamoelectric machine 13 disposed within housing chamber 125 includes winding means 15 adapted for excitation upon the energization of dynamoelectric machine 15, and conductor end leads 17 integral with the winding means and arranged so as to extend generally from preselected part 28 of the winding means, respectively (FIGS. 9 and 10). A set of means, such as springs 131 or the like for instance, are provided for resiliently mounting dynamoelectric machine 13 to housing 123 within chamber 125 thereof (FIG. 8), and means, such as assembly 21, for receiving conductor lead ends 17 of winding means 15 is associated with connection means or Fusite block 127 for interconnecting the conductor lead ends of the winding means in circuit relation with the Fusite block, respectively (FIGS. 9 and 10). The receiving and interconnecting means or assembly 21 includes a pair of members, such as plug member 23 and retaining member 25 or the like for instance with establishing means 27 therebetween, the plug member being received on electrical connectors 129 of Fusite plug 127 when the receiving and interconnecting means is associated therewith, the retaining member being associated with winding means 15 at least generally adjacent preselected part 28 thereof, and establishing means 27 being operable generally for effecting the establishment of the lost motion engagement therebetween (FIGS. 2, 8 and 9).

More particularly and with specific reference to FIGS. 8-10, means, such as a mounting band or frame 133 or the like for instance, is engaged about the outer circumferential portion of yoke 85 of core 81 for mounting it within housing chamber 125 of unit 121, and a flange 135 associated with mounting means or band 133 is integrally connected with a housing or casing 137 of a hermetic compressor 139 of a type well known to the art. An inductive type rotor indicated generally at 141 is disposed generally coaxially within bore 91 of core 81 and adapted for magnetic coupling relation with winding means 15 on the core upon the excitation thereof when dynamoelectric machine 13 is energized, and the rotor is secured in driving relation to a shaft 143 operable generally for driving hermetic compressor 139. Shaft 139 may be suitably journaled within housing 137 of compressor 139, and springs 131 are biased between the compressor housing and a set of flanges 145 secured to housing 123 of unit 121 within chamber 125 thereof by suitable means such as welding; however, for the sake of drawing simplicity, only one such spring 131 and flange 145 is shown. Thus, springs 131 not only serve to resiliently mount compressor 139 within housing chamber 125 of unit 121 but also serve to resiliently mount dynamoelectric machine 13 therein. As previously mentioned, plug member 23 of assembly 21 on stator 11 is received in circuit relation or plugged onto electrical connectors 129 of Fusite plug 127, and when dynamoelectric machine 13 is energized, rotor 141 is driven in the magnetic coupling relation thereof with excited winding means 15 so as to effect the compressing operation of compressor 139 as is well known to the art. Of course, the operation of compressor 139 effects some vibratory movement thereof as well as dynamoelectric machine 13 with such vibratory movement being at least in part dampened by springs 131. However, it is believed that the spiral winding of the twisted bundle 69 of tubes 19 with conductor lead ends 17 encased therein increases the resistance of the conductor lead ends to the vibration imparted as discussed above to dynamoelectric machine 13 seated in band 133 integrally connected by flanges 135 with compressor housing 137, i.e., serves to dampen such vibration, thereby to maintain the integrity of the connection of plug member 23 with electrical connectors 129 of Fusite plug 127. Further, it is also believed that the spacing of enlarged abutment 101 on casing tail 97 of plug member 23 in the lost motion connection thereof from shoulder 107 on retaining member 25 of assembly 21 also serves to resist the transmission therethrough of the vibration transmitted to dynamoelectric machine 13 upon the operation of compressor 139 thereby to further enhance the integrity of the connection of plug member 23 with electrical connector 129 of Fusite plug 127. While dynamoelectric machine 13 is illustrated herein as an induction motor, it is contemplated that various other types of motors, such as an electronically commutated motor having a permanent magnet rotor for instance, may be utilized in hermetic compressor unit 11 within the scope of the invention so as to meet at least some of the objects thereof, and if more information is desired with respect to electronically commutated motors, one type of such electronically commutated motors is illustrated in the commonly assigned application of John H. Boyd, Jr., Ser. No. 367,951 filed Apr. 13, 1982 which is incorporated herein by reference.

From the foregoing, it is now apparent that a novel stator 11, novel methods of assembling a stator, and a novel hermetic compressor unit 121 are provided meeting the objects and advantageous features set out hereinbefore, as well as others, and it is contemplated that changes as to the precise arrangements, shapes, details and connections of the component parts utilized in such stator, methods and hermetic compressor unit, as well as the precise order of the method steps, may be made by those having ordinary skill in the art without departing from the spirit of the invention or from the scope thereof as defined by the claims which follow.

What I claim as new and desire to secure by Letters Patent of the United States is:

1. A hermetic compressor unit driven by a dynamoelectric machine therein adapted to be energized from a source of power, the unit comprising:

a housing having a hermetically sealed chamber therein;

connection means mounted to said housing so as to extend in part therethrough into said chamber and adapted for connection with the power source, said connection means including a set of electrical connectors;

a stationary assembly of said dynamoelectric machine disposed within said chamber and including a core having a pair of opposite end faces, a bore extending generally axially through said core and intersecting with said opposite end faces, and a plurality of winding means receiving slots intersecting with both said bore and said opposite end faces, respectively;

winding means associated with said core and adapted for excitation upon the energization of the dynamoelectric machine, said winding means including a plurality of coils formed of conductor material having a coating of dielectric material thereon and each coil having at least one conductor loop with opposite side loop portions thereof being disposed in said slots of said core and with opposite end loop portions thereof being arranged in generally annular groupings adjacent said opposite end faces of said core, respectively, some of said coils defining a main winding of said winding means and others of said coils defining an auxiliary winding of said winding means; a pair of main winding lead ends integral with said main winding and extending from one of said end loop groupings, a pair of auxiliary winding lead ends integral with said auxiliary winding and extending from said one end loop grouping of said winding means, one of said main winding lead ends and one of said auxiliary winding lead ends being twisted together to define a common lead end of said winding means; and a set of terminals on said common lead end, the other of said main winding lead ends, and the other of said auxiliary winding lead ends, respectively;

assembly means for associating said winding means in circuit relation with said electrical connectors of said connection means, said assembly means including: casing means removably mounted to said electrical connectors of said connection means for receiving said terminals and for connecting them in circuit relation with said electrical connectors of said connection means, respectively, an elongate member integral with said casing means and extending therefrom generally toward said one end loop grouping of said winding means, a free end portion on said elongate member, a first abutment on said free end portion, a retaining member disposed at least adjacent said one end loop grouping of said winding means, a pair of stepped passages in said retaining member, said free end portion of said elongate member extending through one of said stepped passages, and a second abutment on said retaining member between said stepped passages thereof; said first abutment on said free end portion of said elongate member being movable in the other of said stepped passages of said retaining means so as to engage with said second abutment thereby to establish a lost motion engagement between said elongate member and said retaining member;

a pair of means associated with said end loop groupings of said winding means for lacing them, respectively, and one of said lacing means associated with said one end loop grouping of said winding means being interconnected in engagement with said retaining member of said associating means thereby to at least generally maintain said retaining member against displacement from its disposition at least adjacent said one end loop grouping of said winding means in the event of the occurrence of the lost motion engagement between said first and second abutments of said elongate member and said retaining member, respectively;

a set of generally elongate tubes of a dielectric material encasing said other main winding lead end, said other auxiliary winding lead end, and said common lead end, and extending generally between said casing means and said one end loop grouping of said winding means; said elongate tubes with said other main winding lead end, said other auxiliary winding lead end, and said common lead end encased therein being twisted together generally into a twisted bundle and also generally spirally wrapped about at least a part of said elongate member between said casing means and said retaining member, respectively;

a compressor within said chamber including means for mounting engagement with said dynamoelectric machine;

a set of means for resiliently mounting both said compressor and said dynamoelectric machine to said housing, respectively;

a rotor disposed at least in part within said bore of said stator and associated in magnetic coupling relation with said winding means upon the excitation thereof; and a shaft supporting said rotor and drivingly interconnected with said compressor.

2. A hermetic compressor unit driven by a dynamoelectric machine therein adapted to be energized from a souce of power comprising:

a housing having a chamber therein;

connection means mounted to said housing so as to extend in part therethrough into said chamber and adapted for connection with the power source, said connection means including a set of electrical connectors;

a stator of said dynamoelectric machine disposed within said chamber and having a pair of opposite end faces;

means for resiliently mounting said stator within said chamber;

winding means associated with said stator and adapted for excitation upon the energization of said dynamoelectric machine, said winding means including a main winding section and an auxiliary winding section with parts thereof arranged in generally opposite first and second annular winding groupings adjacent said opposite end faces of said stator, respectively, a pair of first lead ends integral with said main winding section and extending from the first of said opposite annular winding groupings, a pair of second lead ends integral with said auxiliary winding section and extending from said second opposite annular winding grouping, one of said first and second lead ends defining a common lead end of said winding means, and a set of terminals secured to said common lead end and the other of said first and second lead ends, respectively;

an assembly including a plug member mounted to said electrical connectors and arranged to receive said terminals and connect them in circuit relation with said electrical connectors, respectively, a retaining member disposed at least adjacent the first annular winding grouping, an integral elongate member extending from one of said retaining member and said plug member, a first abutment on said integral elongate member, passage means in the other of said retaining member and said plug member for receiving said integral elongate member, a second abutment on said other of said retaining member and said plug member and arranged for lost motion engagement with said first abutment on said integral elongate member thereby to limit relative displacement movement of said plug member with respect to said retaining member, respectively;

means associated with the second annular winding grouping and said retaining member for at least opposing displacement of said retaining member from its disposition at least adjacent said second annular winding grouping in the event of the occurrence of the lost motion engagement between said first and second abutments on said integral elongate member and said other of said retaining member and said plug member, respectively; and a set of generally elongate tubes of a dielectric material encasing each of said one of said first and second lead ends and said common lead end and extending generally between said plug member and said one opposite annular winding grouping of said winding means, said elongate tubes with said one of said first and second lead ends and said common lead end encased therein being twisted together into a twisted bundle thereof and said twisted bundle also being generally spirally wrapped about at least a part of said integral elongate member between said plug member and said retaining member, respectively.

3. A hermetic compressor unit driven by a dynamoelectric machine adapted to be energized from a source of power comprising:

a housing having a chamber therein;

connection means mounted to said housing so as to extend in part therethrough into said chamber and adapted for connection with the power source, said connection means including a set of electrical connectors;

a stationary assembly of said dynamoelectric machine disposed within said chamber and including winding means adapted for excitation upon the energization of said dynamoelectric machine, and a set of lead ends integral with said winding means and arranged so as to extend generally from a preselected part of said winding means, respectively; and another assembly including receiving and interconnecting means for receiving said lead ends of said winding means and associated with said connection means for interconnecting said lead ends of said winding means in circuit relation with said connection means, retaining means for securement with said stationary assembly at least generally adjacent said preselected part of said winding means, and establishing means associated with said receiving and interconnecting means and said retaining means and operable generally for establishing a lost motion engagement therebetween, respectively.

4. A hermetic compressor unit as set forth in claim 3 wherein the length of said lead ends of said winding means is predeterminately greater than that between said receiving and interconnecting means and said retaining means when the lost motion engagement is established therebetween by said establishing means.

5. A hermetic compressor unit as set forth in claim 3 further comprising insulating means associated with said lead ends of said winding means for insulating them electrically from each other, said insulating means and said lead ends of said winding means being generally spirally arranged about said establishing means at least in part between said receiving and interconnecting means and said retaining means, respectively.

6. A hermetic compressor unit as set forth in claim 3 further comprising a set of generally elongate tubes of a dielectric material at least in part encasing said lead ends of said winding means and extending generally between said receiving and interconnecting means and said preselected part of said winding means, said elongate tubes with said winding leads of said winding means encased therein being twisted together into a twisted bundle thereof and said twisted bundle also being generally spirally wrapped about said establishing means at least in part between said receiving and engagement means and said retaining means, respectively.

7. A hermetic compressor unit as set forth in claim 3 further comprising means associated with said retaining means and said winding means for securing said retaining means generally against displacement from said stationary assembly.

8. A stationary assembly for a dynamoelectric machine comprising:

a core including a pair of opposite end faces, a bore extending generally axially through said core and intersecting with said opposite end faces, and a plurality of winding receiving slots in said core intersecting with both said bore and said opposite end faces;

winding means for association with said core and including a plurality of coils respectively formed of conductor material having a coating of dielectric material thereon, each of said coils having at least one conductor loop with opposite side loop portions thereof being arranged in said slots of said core and with opposite end loop portions thereof being arranged generally in opposite annular first and second end loop groupings adjacent said opposite end faces of said core generally about the intersections thereof with said bore, respectively, some of said coils defining a main winding of said winding means and others of said coils defining an auxiliary winding of said winding means, a pair of main winding lead ends of the conductor material integral with said main winding and extending from said first end loop grouping, a pair of auxiliary winding lead ends of the conductor material integral with said auxiliary winding and extending from said first end loop grouping at least generally adjacent said main winding lead ends, one of said main winding lead ends and one of said auxiliary winding lead ends being twisted together to define a common lead end of said winding means, and a set of terminals on said common lead end, the other of said main winding lead ends and the other of said auxiliary winding lead ends, respectively;

plug means for receiving said terminals, and said plug means including an elongate member integral therewith and extending therefrom generally toward said first end loop grouping, a free end portion on said elongate member, and a first abutment on said free end portion;

retaining means for said plug means disposed at least adjacent said first end loop grouping and including first and second stepped passages therein, said free end portion of said elongate member extending through a first one of said stepped passages, a second abutment on said retaining means between said stepped passages thereof, said first abutment on said free end portion on said elongate member being movable in the second one of said stepped passages so as to engage with said second abutment thereby to establish a lost motion engagement between said plug means and said retaining means;

a set of generally elongate tubes of a dielectric material encasing said other main winding lead end, said other auxiliary winding lead end, and said common lead end and extending at least in part between said plug means and said first end loop grouping; said elongate tubes with said other main winding lead end, said other auxiliary winding lead end, and said common lead end encased therein being twisted together into a twisted bundle and also generally spirally wrapped about said elongate member at least in part between said plug means and said retaining means; and means for securing said retaining means at least adjacent said first end loop grouping of said winding means.

9. A stationary assembly for a dynamoelectric machine comprising:

a core including a pair of opposite end faces, a bore extending generally axially through said core, and a plurality of winding receiving slots in said core intersecting with both said bore and said opposite end faces;

winding means for association with said core and including a plurality of coils each having at least one conductor loop with opposite side loop portions thereof being arranged in said slots of said core and with opposite end loop portions thereof being arranged in opposite generally annular first and second end loop groupings adjacent said opposite end faces of said core generally about the intersections thereof with said bore, a set of winding means lead ends extending from the first end loop grouping and having a preselected length, and a set of terminals on said lead ends, respectively;

plug means for receiving said terminals;

retaining means for securement with the stationary assembly at least adjacent said first end loop grouping, and said retaining means and said plug means including establishing means operable generally for establishing a lost motion engagement therebetween so that the distance between said plug means and said first end loop grouping is predeterminately less than the preselected length of said lead ends in the event of the occurrence of lost motion engagement between said plug means and said retaining means by said establishing means.

10. A stationary assembly as set forth in claim 9 further comprising means, associated with said lead ends for insulating them electrically from each other, extending at least in part between said plug means and said first end loop grouping.

11. A stationary assembly as set forth in claim 9 further comprising a set of generally elongate tubes of a dielectric material encasing said lead ends and extending at least in part between said plug means and said first end loop grouping.

12. A stationary assembly as set forth in claim 11 wherein said elongate tubes with said lead ends encased therein comprise a twisted bundle, with said twisted bundle being spirally wrapped about said establishing means at least in part between said retaining means and said plug means.

13. A stationary assembly for a dynamoelectric machine comprising:

a core;

winding means for association with said core and including a plurality of winding means lead ends extending generally from a preselected part of said winding means and having a preselected length, respectively;

plug means for receiving said lead ends;

retaining means adapted for association with said plug means and secured at least adjacent said preselected part of said winding means, and said retaining means and said plug means including establishing means operable generally for establishing a lost motion engagement therebetween so that the distance between said plug means and said preselected part of said winding means is predeterminately less than the preselected length of said lead ends in the event of the occurrence of the lost motion engagement between said plug means and said retaining means upon the operation of said establishing means.

14. A stationary assembly as set forth in claim 13 further comprising means associated with at least one of said winding means and said retaining means for securing said retaining means at least adjacent said preselected part of said winding means.

15. A stationary assembly as set forth in claim 13 further comprising means associated with said lead ends for insulating them electrically from each other and extending at least in part between said plug means and said preselected part of said winding means.

16. A stationary assembly as set forth in claim 13 further comprising a set of generally elongate tubes of a dielectric material encasing said lead ends and extending at least in part between said plug means and said preselected part of said winding means.

17. A stationary assembly as set forth in claim 16 wherein said elongate tubes with said lead ends encased therein comprise a twisted bundle, said twisted bundle being spirally wrapped about said establishing means at least in part between said plug means and said retaining means.

* * * * *